United States Patent
Chappidi et al.

(10) Patent No.: US 7,152,791 B2
(45) Date of Patent: Dec. 26, 2006

(54) IDENTIFYING THE LOCATION OF AN ASSET

(75) Inventors: Gopinath Chappidi, Bangalore (IN); Vinayak Sadashiv Kore, Bangalore (IN)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/708,902

(22) Filed: Mar. 30, 2004

(65) Prior Publication Data

US 2005/0258240 A1 Nov. 24, 2005

(51) Int. Cl.
  G06F 19/00 (2006.01)
  G06Q 30/00 (2006.01)
  G06Q 90/00 (2006.01)
  G06K 19/06 (2006.01)
  G08B 13/14 (2006.01)
(52) U.S. Cl. .................. 235/385; 235/492; 340/572.1; 340/825.39; 340/539.13
(58) Field of Classification Search ................ 235/375, 235/385, 492, 493, 487; 340/825.49, 572.1, 340/10.42, 10.3, 539.13, 539.32; 342/450, 342/464–5, 387–86; 370/349
See application file for complete search history.

(56) References Cited

U.S. PATENT DOCUMENTS

| | | | |
|---|---|---|---|
| 4,907,845 A * | 3/1990 | Wood ...................... 340/573.4 |
| 4,920,488 A | 4/1990 | Filley |
| 5,119,104 A * | 6/1992 | Heller ........................ 342/450 |
| 5,363,425 A * | 11/1994 | Mufti et al. ........... 379/201.06 |
| 5,526,357 A * | 6/1996 | Jandrell ....................... 370/346 |
| 5,686,902 A * | 11/1997 | Reis et al. .................. 340/10.2 |
| 5,804,810 A * | 9/1998 | Woolley et al. ............. 235/492 |
| 5,920,287 A | 7/1999 | Belcher et al. |
| 5,959,568 A * | 9/1999 | Woolley ....................... 342/42 |
| 5,995,046 A | 11/1999 | Belcher et al. |
| 6,121,926 A * | 9/2000 | Belcher et al. ............. 342/450 |
| 6,317,082 B1 | 11/2001 | Bacon et al. |
| 6,366,242 B1 | 4/2002 | Boyd et al. |
| 6,380,894 B1 * | 4/2002 | Boyd et al. .................. 342/450 |
| 6,480,787 B1 * | 11/2002 | Yoshikawa et al. ......... 701/213 |
| 6,512,478 B1 * | 1/2003 | Chien ..................... 342/357.09 |
| 6,539,393 B1 * | 3/2003 | Kabala ........................ 707/102 |
| 6,556,942 B1 * | 4/2003 | Smith .......................... 702/150 |
| 6,720,876 B1 * | 4/2004 | Burgess ..................... 340/568.1 |
| 6,727,818 B1 * | 4/2004 | Wildman et al. .......... 340/573.1 |
| 6,731,198 B1 * | 5/2004 | Stobbe et al. .............. 340/10.33 |
| 6,738,628 B1 * | 5/2004 | McCall et al. ............ 455/456.1 |
| 6,998,985 B1 * | 2/2006 | Reisman et al. .......... 340/573.1 |
| 7,034,684 B1 * | 4/2006 | Boman et al. ............ 340/568.1 |
| 2001/0030625 A1* | 10/2001 | Doles et al. ................ 342/387 |

(Continued)

FOREIGN PATENT DOCUMENTS

EP  0450212 A1  10/1991

(Continued)

Primary Examiner—Daniel Walsh
(74) Attorney, Agent, or Firm—Narendra R. Thappeta

(57) ABSTRACT

According to an aspect of the present invention, an intelligent badge having the ability of collecting the identifiers of each of the badges located within the zone of the intelligent badge may be employed to identify the location of each badge. The central processing system determines the relative location of an asset by processing the sets of identifiers received from multiple intelligent badges. The relative location of an asset is determined by identifying at least one common badge identifier of a badge attached to a corresponding one of assets. The relative location of each asset may be determined with reference to known location of some badges by employing reference badges.

16 Claims, 8 Drawing Sheets

U.S. PATENT DOCUMENTS

| | | |
|---|---|---|
| 2002/0032525 A1* | 3/2002 | Yoshikawa et al. ......... 701/213 |
| 2002/0059230 A1 | 5/2002 | Hunepohl et al. |
| 2002/0101340 A1* | 8/2002 | Starkey ...................... 340/447 |
| 2002/0125996 A1* | 9/2002 | Feinberg .................. 340/10.41 |
| 2002/0167417 A1* | 11/2002 | Welles et al. .......... 340/825.49 |
| 2002/0178100 A1 | 11/2002 | Koveos |
| 2002/0183979 A1* | 12/2002 | Wildman .................... 702/188 |
| 2003/0013146 A1 | 1/2003 | Werb |
| 2003/0020605 A1* | 1/2003 | Starkey ...................... 340/447 |
| 2003/0030568 A1* | 2/2003 | Lastinger et al. ...... 340/825.49 |
| 2003/0069002 A1 | 4/2003 | Hunter |
| 2003/0137968 A1* | 7/2003 | Lareau et al. ............... 370/349 |
| 2003/0191767 A1* | 10/2003 | Kabala ...................... 707/100 |
| 2003/0234741 A1* | 12/2003 | Rogers et al. .............. 342/463 |
| 2004/0021566 A1* | 2/2004 | Hayashi et al. ........ 340/539.13 |
| 2004/0104817 A1* | 6/2004 | Wijk .......................... 340/505 |
| 2004/0108954 A1* | 6/2004 | Richley et al. ............. 342/387 |
| 2004/0155778 A1* | 8/2004 | Shek et al. ............... 340/572.1 |
| 2004/0174260 A1* | 9/2004 | Wagner ................... 340/568.1 |
| 2004/0174264 A1* | 9/2004 | Reisman et al. ......... 340/573.4 |
| 2004/0189471 A1* | 9/2004 | Ciarcia et al. ........... 340/572.1 |
| 2004/0212480 A1* | 10/2004 | Carrender et al. ....... 340/10.42 |
| 2005/0223266 A1* | 10/2005 | Forster ........................ 714/25 |
| 2006/0055538 A1* | 3/2006 | Ritter ...................... 340/572.1 |
| 2006/0055552 A1* | 3/2006 | Chung et al. ............ 340/686.1 |
| 2006/0131405 A1* | 6/2006 | Schneider ................... 235/385 |
| 2006/0139167 A1* | 6/2006 | Davie et al. ........... 340/539.13 |

FOREIGN PATENT DOCUMENTS

| | | |
|---|---|---|
| WO | WO 97/49972 A2 | 12/1997 |
| WO | WO 99/39219 A1 | 8/1999 |
| WO | WO 00/48016 A1 | 8/2000 |
| WO | WO 01/06401 A1 | 1/2001 |
| WO | WO 01/07928 A1 | 2/2001 |
| WO | WO 01/29574 A2 | 4/2001 |
| WO | WO 01/30632 A1 | 5/2001 |
| WO | WO 02/067006 A2 | 8/2002 |
| WO | WO 02/088776 A2 | 11/2002 |
| WO | WO 2091297 A1 * | 11/2002 |

* cited by examiner

IDENTIFYING THE LOCATION OF AN ASSET

BACKGROUND OF INVENTION

1. Field of the Invention

The present invention generally relates to asset locator systems, and more specifically to a method and apparatus for identifying the location of an asset.

2. Related Art

An asset, as used in the present application, generally refers to a property which can be moved from one location to another. For example, in the airline industry, passenger bags (assets) are transported across multiple locations (e.g., from check-in place to temporary storage place, to a sequence of flights, and then to check-out place in the destination location).

There is a general need to identify the present location of an asset. In the airline example of above, it is desirable to know in which airport/storage place, etc., a specific baggage is present. The information may then be used to track the location of the asset, if such a need arises, as is well known in the relevant arts.

A prior approach may attach a badge ("asset badge") to an asset sought to be tracked/located. The badge may transmit a unique identifier periodically, and a reader may be designed to receive/decipher the identifiers. The area covering the location of such badges generally forms the zone of a reader. The reader may forward the identifiers to a central data processing system, using which a user may determine that an asset of interest is within a zone of operation of a corresponding reader.

One problem with the above approach is that the specific position of the asset within that zone may not be identified even approximately. It may be desirable to identify the specific location of an asset within a zone of a reader.example, assuming that an explosion (due to a bomb) is determined to have occurred in a specific location, it may be desirable to know the specific assets that were present around/at that location (for investigation purposes). Unfortunately, it may not be possible to determine the specific location of assets within a zone of the reader.

International application number WO 01/06401 A1 published (hereafter "PCT Application") under Patent Cooperation Treaty (PCT) entitled, "Method and Apparatus for Mobile Tag Reading" naming Jay Werb as inventor teaches various approaches to determine the specific location of the badges/assets. The approaches there, among other techniques, appear to rely on approaches such as Global Positioning System (GPS) in individual badges (see for example, line 30 page 6 through line 3 page 7 of the PCT Application) or travel time-of-flight of signals between a tag and tag reader (see, for examples, lines 17–25 of Page 9 of the PCT Application).

Unfortunately, implementation of GPS support in individual tags may lead to unacceptably high cost solutions. On the other hand, approaches based on time of flight of signals may not be suitable in situations when assets are closely located since such techniques are generally based on measuring a round-trip time of a signal sent by a reader and reflected by the specific asset. In particular, the reader may not be able to identify which specific one of the tags has reflected the signal, thereby posing challenges in determining the specific location of an asset of interest. In addition, since all badges need to have support for cooperatively reflecting the signals sent by a reader, the total cost of such implementation may also be unacceptably high.

What is therefore needed is a method and apparatus enabling identifying the location of an asset.

SUMMARY OF INVENTION

A tracking system provided according to an aspect of the present invention tracks the location of multiple assets of interest. The tracking system may contain asset badges which are respectively attached to corresponding assets of interest. asset badge transmits a corresponding badge identifier. The tracking system may further contain multiple intelligent badges, with each intelligent badge receiving a corresponding one of multiple sets of badge identifiers, and in turn sending the corresponding one of multiple sets of badge identifiers to a processing system. For example, assuming for illustration that there are only three intelligent badges respectively receiving three, four and six badge identifiers, the three intelligent badges send the respective received sets of three, four and six badge identifiers.

The processing system receives and processes the multiple sets of badge identifiers and corresponding identifiers of the intelligent badges to determine a relative location of the assets of interest. In an embodiment, the determination of relative location is based on the overlap of the sets of badge identifiers. As a result, the location of each asset of interest may be determined at least approximately. A reader may be provided to receive the sets of badge identifiers, and forward the sets to the processing system.

The tracking system may also contain a reference badge positioned at a known location in an area where multiple assets are located. The reference badge may transmit a reference badge identifier. The intelligent badges receiving the reference badge identifier, may include the reference badge identifier in the corresponding sets of badge identifiers sent to the processing system. As the location of the reference badge is known, the location of the asset badges (and thus the assets) may be determined in relation to the known location.

Another aspect of the present invention enables a group of assets to be tracked in a cost-effective manner. In an embodiment, a set of component badges respectively attached to corresponding one of the assets transmit respective badge identifiers, which are collected by an active badge. An active badge may send the set of component badge identifiers and a self-identifier (of active badge) to a corresponding intelligent badge. The processing system receives the set of badge identifiers from a corresponding intelligent badge and determines the relative location of the active badge similar to the determining of location of asset badges.

The approximate location of each of the assets attached to one of the component badges is deemed to be the same as the relative location of the active badge. As a result, the processing requirements on the processing system may be reduced. In addition, the component badges may be designed to transmit badge identifier using energy derived from signal transmissions from the active badges, and the overall cost may be reduced as a result as well.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the left-most digit(s) in the corresponding reference number.

BRIEF DESCRIPTION OF DRAWINGS

The present invention will be described with reference to the accompanying drawings which are described briefly below.

DETAILED DESCRIPTION

1. Definitions

Figure 1:
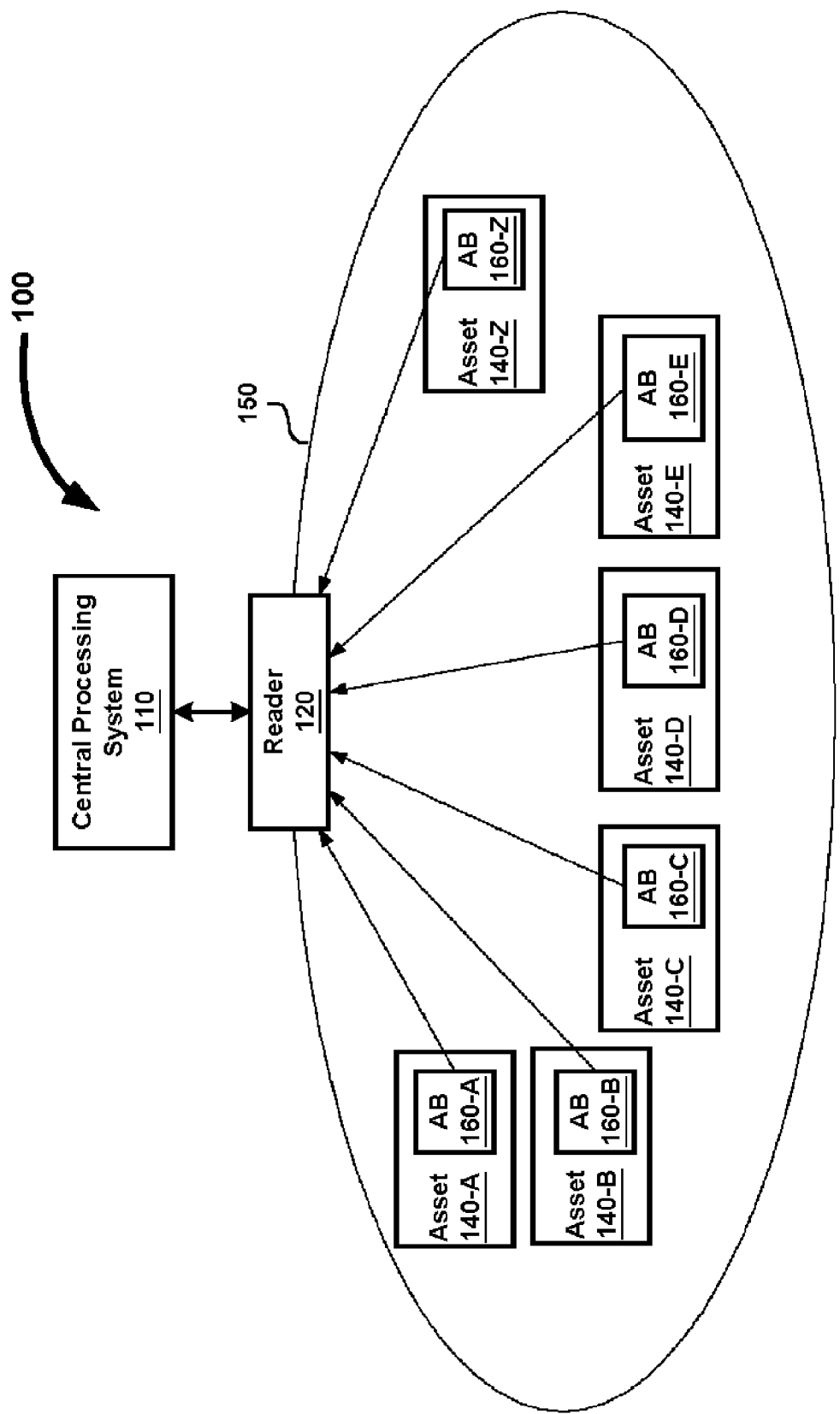
FIG. 1 is a block diagram of an example environment illustrating the problem in identifying the specific location of an asset using a prior approach.

The following definitions are used in the subject patent application:Asset Badge: A badge attached to an asset. An asset badge transmits a self-identifier or badge identifier (any signal/data that uniquely identifies the asset badge) using a wire-less technology (e.g., based on infra-red signals).

Reference Badge: A badge whose location is predefined/identified (e.g., by placing the reference badge in a known location or by using technologies such as GPS) Intelligent Badge: A badge which can collect the self-identifiers of asset badges (including active badges, described below), reference badges and other intelligent badges within its (i.e., of the intelligent badge) zone. The collected identifiers are passed to a data processing system to determine the location of the badges.

Active Badge: A type of asset badge, which is associated with a group of assets. The active badge collects the identifiers of a group of component badges (defined below), and transmits the group of identifiers along with a self-identifier (of the active badge) to an intelligent badge.

Component Badge: A badge which transmits a self-identifier, which is recognised (or collected) by an associated active badge only (not by reader or intelligent badges). A group of component badges associated with an active badge areas being in a single location (and thus, only the self-identifier of the active badge is considered in determining the location of assets).

Reader: A device which receives the sets of self-identifiers from corresponding intelligent badges, and forwards the same to a processing system. In an embodiment described below, the reader receives the self-identifiers from various asset badges as well.

2. Overview

According to an aspect of the present invention a few intelligent badges (IB) are attached to corresponding few assets and asset badges (AB) are attached to the remaining assets, with all assets being located in a nearby area. Each AB may periodically transmit a corresponding unique identifier and each IB collects a set of all the received identifiers. Each IB may transmit a corresponding set of identifiers to a reader, which forwards the sets to a digital processing system. The digital processing system may analyze the sets to determine the approximate relative location of each (asset and intelligent) badge. A few reference badges (RB) may be provided at pre-specified locations such that the approximate absolute (in relation to the pre-specified locations) location of the RBs and IBs may be determined.

In another embodiment, each asset is associated with an IB and each IB collects the identifiers of all the badges operating within the zone of a corresponding IB. In the example in relation to the airports, the zone is typically of the order of a few feet. However, depending on the environment in which the features of the present invention are employed, the zone coverage can be less or more (e.g., many miles).

Each IB may pass a corresponding set of received identifiers to a reader, which in turn passes the received sets to a digital processing system. The digital processing system processes the sets to determine the approximate location of each asset/badge. Associating each asset with a corresponding IB improves the resolution of identifying the location of an asset. In addition, by having IBs collect the identifiers of other IBs (if in the zone/range), the computation of the location can be further simplified.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well_known structures or operations are not shown in detail to avoid obscuring the invention.

3. Prior Environment

FIG. 1 is a block diagram of a prior environment illustrating some problems in a corresponding approach. Environment 100 is shown containing central processing system 110, reader 120 (with an associated zone 150), assets 140_A through 140_X, and asset badges (AB) 160_A through 160_Z. Each block is described below in further detail.

For illustration, the prior example environment is shown containing a central processing system 110 receiving data from only one reader (120 associated with zone 150) for conciseness. However, in typical environments a central processing system may receive data from multiple readers to identify and/or track the location of an asset of interest.

Each asset badge 160-A through 160-Z is attached to a corresponding asset 140-A through 140-Z. Each badge is implemented with a unique badge identifier. Each badge periodically transmits the corresponding badge identifier. The badges are referred to as asset badges (AB) to distinguish from intelligent badges (described in sections below).

The approximate location of the badge (and thus the corresponding asset) is determined based on the transmitted signals, as described below.

Reader 120 receives badge identifiers from asset badges 160-A through 160-Z located within zone 150, and sends data representing the set of received identifiers to a central processing system 110. For example, reader 120 may receive the corresponding identifiers from asset badges 160-A through 160-Z (respectively associated with assets 140-A through 140-Z) using a radio frequency (RF) signals, and forward the data representing identifiers to central processing system 110 using technologies such as local area networks (LANs). Reader 120 may be placed in a fixed location.

Central processing system 110 receives data from multiple readers (only one reader shown for conciseness) covering a corresponding zone. Based on the reader that is sending the identifiers (of badges), central processing system 110 determines that an asset of interest is in that specific zone. However, it may not be possible to determine the specific location/position corresponding to an asset within a zone corresponding to a reader. The description is continued with reference to the manner in which the specific location of an asset/badge (within a zone) can be determined according to an aspect of the present invention.

4. Tracking Location of a Badge/Asset Within a Zone of the Reader

Figure 2:
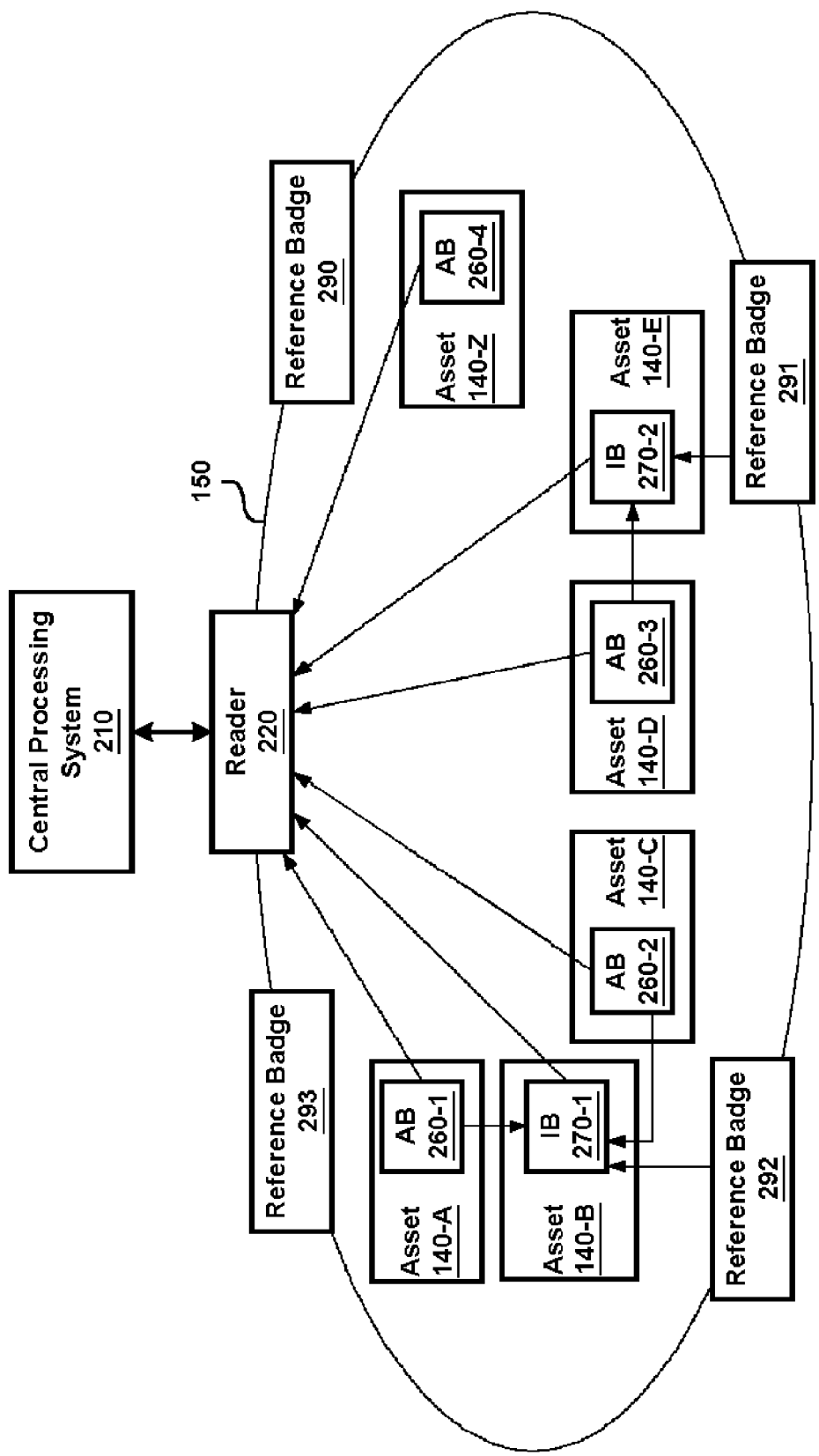
FIG. 2 is a block diagram illustrating the details of an example tracking system implemented according to an aspect of the present invention.

FIG. 2 is a block diagram illustrating the manner in which the specific location of assets 140-A through 140-Z can be tracked according to an aspect of the present invention. The block diagram is shown containing central processing system 210, reader 220, assets 140-A through 140-Z, asset badges 260-1 through 260-4, intelligent badges 270-1 and 270-2, and reference badges 290 through 293 (in addition to the badges introduced in FIG. 1). Each block is described in detail below.

Each asset 140-A through 140-Z is shown attached to one of either an intelligent badge (IB) or an asset badge (AB). By appropriate use of the IBs, the location of an asset within a zone of the reader, can be determined as described below in further detail.

Asset badges 260-1 through 260-4 are respectively attached to assets 140-A, 140-C, 140-D, and 140-Z. The asset badges transmit a corresponding unique identifier periodically using wireless signal/technology such as infrared signals. The identifiers transmitted by an asset badge (operating in the zone of a corresponding IB(s)) may be collected by a corresponding IB(s). Identifier of each asset badge may be directly sent to a corresponding reader using RF signal as well. As described below, the identifiers are received by the reader.

Reference badges 290 through 293 (not attached to an asset) may be installed at pre-specified locations such that the approximate absolute location of the asset badges and IBs may be determined. A reference badge transmits a corresponding identifier using, for example, an IR signal and may be received by a corresponding IB(s).

Intelligent badges (IB) 270-1 and 270-2 are shown attached to assets 140-B and 140-E respectively. IB collects identifiers from badges (asset, reference, and other intelligent badges) located within the corresponding badge zone, and sends data representing the set of collected identifiers to reader 220 (e.g., using RF transmissions) along with a self-identifier representing the IB transmitting the data. As intelligent and asset badges are associated with assets that may move, the set of collected identifiers may also be different at different time points as well. In addition, each IB may transmit self-identifiers similar to asset badges, and other IBs may process (collect and forward) such self-identifier similar to the identifiers of the asset badges.

Reader 220 is implemented to receive a combination of set of collected identifiers and self identifier (of a corresponding IB) from each of IBs 270-1 and 270-2. Reader 220 may receive badge identifiers directly from asset badges 260-1 through 260-4 as well. Data representing the combination (both set and self identifier of the IB sending the set), and identifier of each asset badge may be forwarded to central processing system 210 using (wired/wireless) networking technologies such as local area networks (LANs), wide area networks (WAN), internet etc.

Central processing system 210 receives data sent by reader 220 and identifies the approximate location of each asset/badge within the reader zone. Various mathematical approaches may be employed to determine the approximate location. In one embodiment, information indicating the specific location at which each reference badge is located, is provided to central processing system 210. Depending on the specific reference badges falling within the zone of each IB, the approximate location of the IB is determined. By having more reference badges, the location of IBs can be more precisely identified.

After the approximate location of each IB is identified, the relative location of each AB (and thus the corresponding asset) can be determined based on the specific IB zones the AB is indicated to be part of. Again, the location of each AB can be determined more accurately by employing more IBs. Thus, the accuracy of determination of specific location of each AB can be enhanced by increasing the number of reference badges (RBs) and intelligent badges (IB).

It should be appreciated that RF and IR merely represent example technologies using which various types of data is transmitted. However, various aspects of the present invention can be implemented using any other wireless technology as well. The manner in which different types of badges can be used/operated to identify the location of an asset according to an aspect of the present invention is described below.

Figure 3:
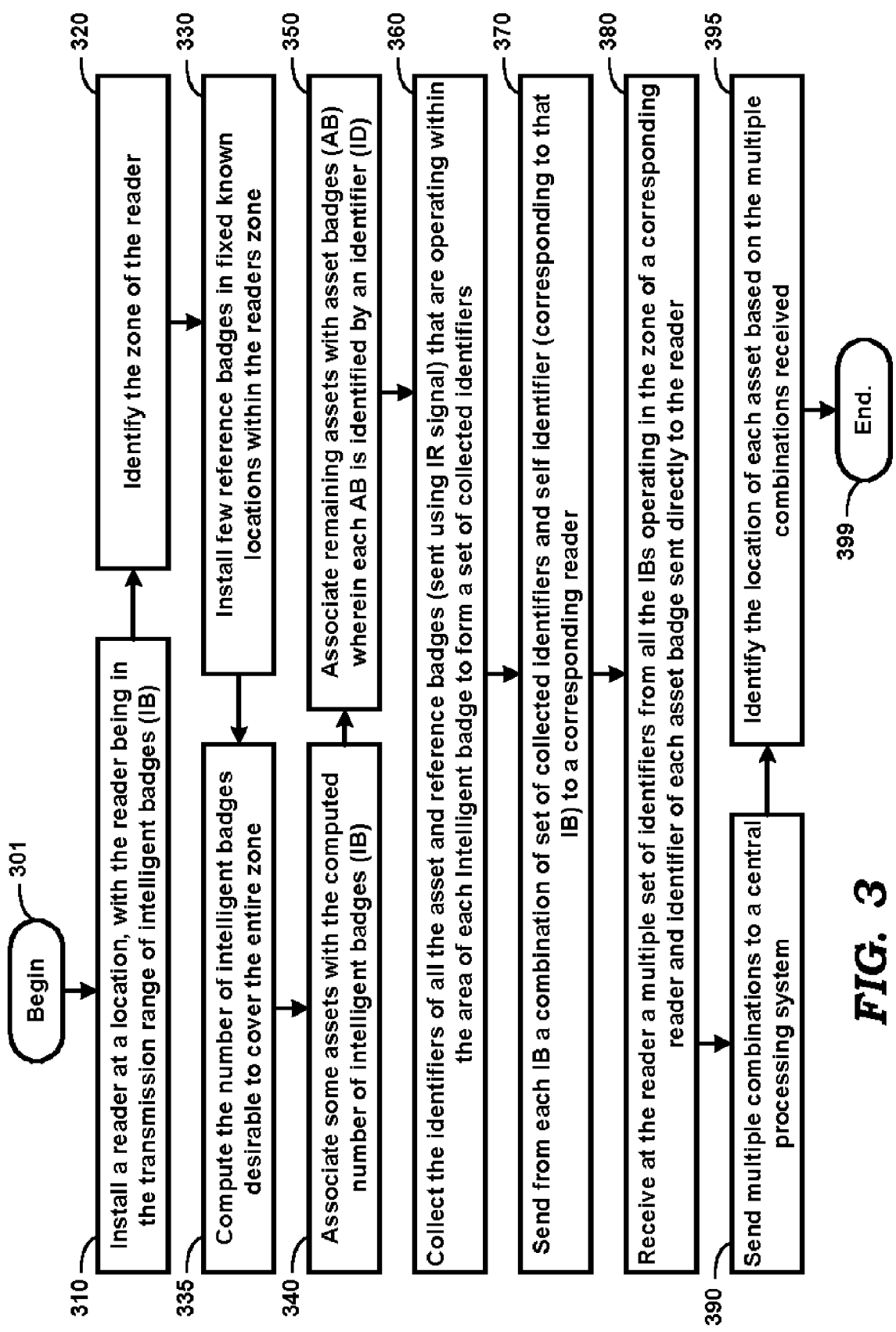
FIG. 3 is a flow-chart illustrating the details of an approach employing intelligent badges associated with some assets to identify the relative location of an asset within a zone of a reader according to an aspect of the present invention.

5. Using Intelligent Badges to Identify the Specific Location of an Asset of Interest FIG. 3 is a flow-chart illustrating the manner in which specific location of an asset can be identified according to an aspect of the present invention. For illustration, the flow-chart is described with reference to example environment of FIG. 2. However, the method may be implemented in other environments as well. The method begins in step 301 in which control immediately passes to step 310.

In step 310, a reader is installed at a location, with the reader being in the transmission range of intelligent badges. In general, readers are installed at locations wherein the specific location of assets may need to be identified. For example, reader 220 may be installed at a location in the airport area where the baggage is stored prior to loading in an airplane.

In step 320, the zone corresponding to a reader may be identified. The zone may be identified based on the expected distance the signals generated by the intelligent badges (IB) and asset badges can travel with sufficient strength to permit recovery of the encoded data. In the above example, zone 150 of reader 220 corresponds to an area within which reader 220 may receive RF signals sent by intelligent badges 270-1 and 270-2.

In step 330, few reference badges may be installed in pre-specified (fixed known) locations within the reader's zone. Reference badges 290 through 293 may be fixed at known locations (e.g., close to the entrance of zone 150). In step 335, the number of intelligent badges desirable to cover the entire zone may be computed. In an embodiment, number of IBs may be computed statistically (using approaches, which will be apparent to one skilled in the relevant arts by reading the disclosure provided herein) to ensure that the badge zones (after being attached to assets) of all the intelligent badges together cover zone 150.

In step 340, some assets are associated with the computed number of intelligent badges. For example, assets 140-B and 140-E may be associated with IBs 270-1 and 270-2 respectively. In step 350, remaining assets (other than the ones associated with IBs noted above) are associated with asset badges (AB). Thus, badges 260-1, 260-2, 292, and 293 may fall within the badge zone of IB 270-1, and badges 260-3, 260-4, 290 and 291 may fall within the badge zone of IB 270-2.

In step 360, an intelligent badge may collect the identifiers of all the asset and reference badges located within a corresponding badge zone. In step 370, a combination of set of collected identifiers and self identifier (corresponding to that IB) are sent from each IB to a corresponding reader. For example, IB 270-1 sends a combination of the set of collected identifiers (of 260-1, 260-2, 292, and 293) and the self identifier to reader 220.

In step 380, reader 220 receives the combination (of set of collected identifiers and self identifiers) sent by each IB (located in the zone of that reader), and badge identifier of each asset badge that is sent directly (not via IB). In step 390, reader 220 sends combinations (sent by IBs) to central processing system 210.

In step 395, central processing system 210 computes the specific location of each asset by analyzing the multiple combinations received from each reader. The method ends in step 399. Thus, using the approach(es) described above, the location of an asset within a reader zone can be determined. It should be appreciated that various improvements may be made to the embodiment(s) described above. Some example improvements are described below in further detail.

6. Associating Each Asset with an Intelligent Badge

Figure 4:
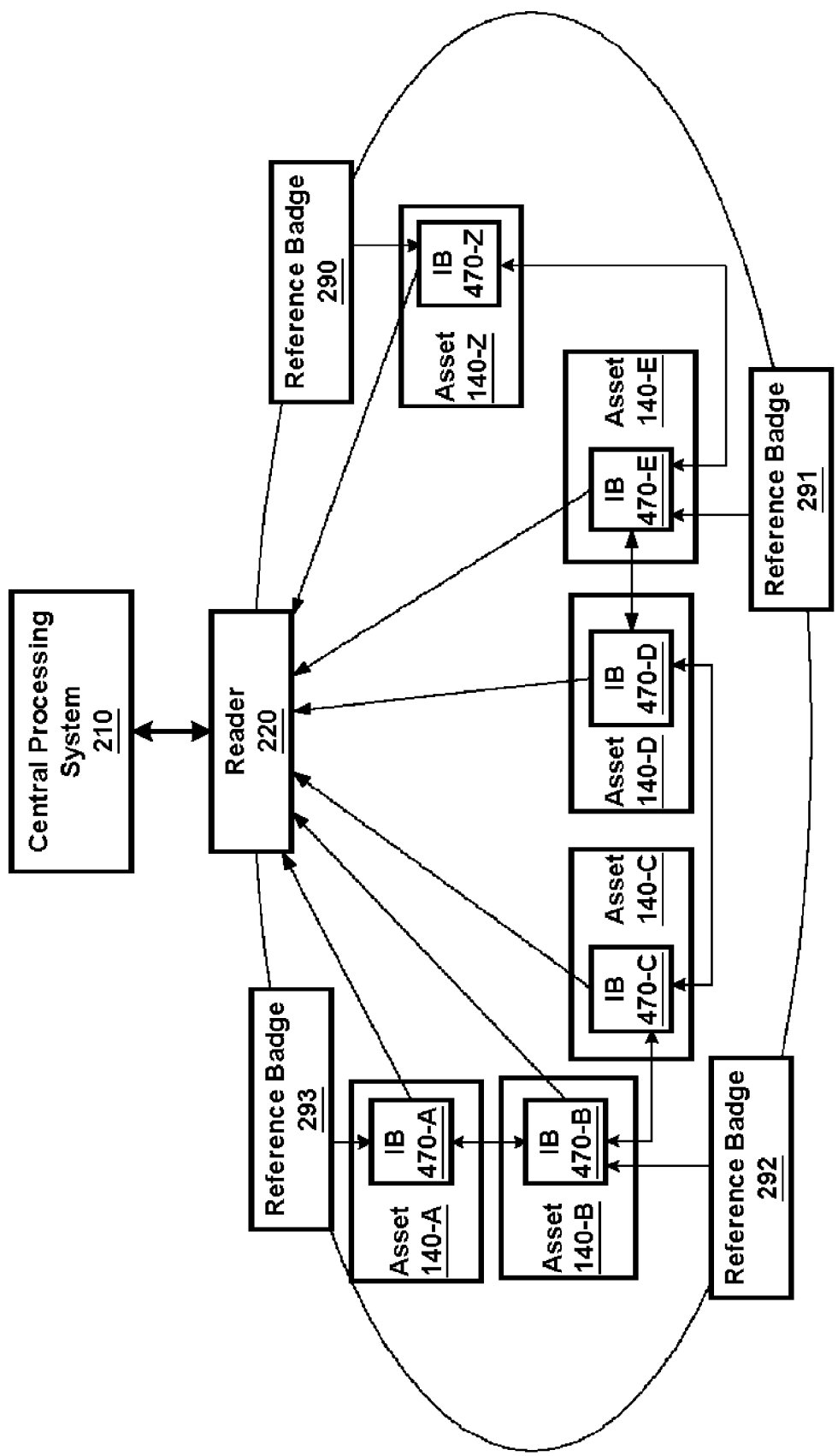
FIG. 4 is a block diagram of an example environment implemented according to one more aspect of the present invention.

FIG. 4 is a block diagram illustrating an example environment implemented according to another aspect of the present invention. The block diagram is shown containing central processing system 210, reader 220, assets 140-A through 140-Z, intelligent badges 470-A through 470-Z, and reference badges 290 through 293. Only the differences in FIG. 4 as compared to that of FIG. 2 is described below for conciseness.

Intelligent badges 470-A through 470-Z are respectively associated with assets 140-A through 140-Z. Each intelligent badge collects identifiers of all other intelligent badges located in a corresponding badge zone. A combination of set of collected identifiers and self identifier is sent to reader 220. The number of combinations received by reader 220 may equal number of intelligent badges (assets).

For example, IB 470-A (associated with asset 140-A) collects the identifiers of IB 470-B and reference badge 293, generates a set, and sends the set along with identifier of IB 470-A. Similarly, IB 470-C sends a combination of set containing identifiers of IB 470-B, 470-D, and reference badge 292 to central processing system 210, which determines the specific location of each badge within a reader zone.

It should be understood that the resolution of identifying the location of an asset is enhanced (compared to FIG. 2) due to associating each asset with an intelligent badge. Each IB sending a combination (of sets and self identifiers) increases the number of combination received at the reader 220 and central processing system 210. The increased number of combinations may potentially result in identifying the approximate location of each asset more accurately.

The description is continued with reference to a manner in the above configuration of badges is used/operated to increase the resolution according to an aspect of the present invention.

Figure 5:
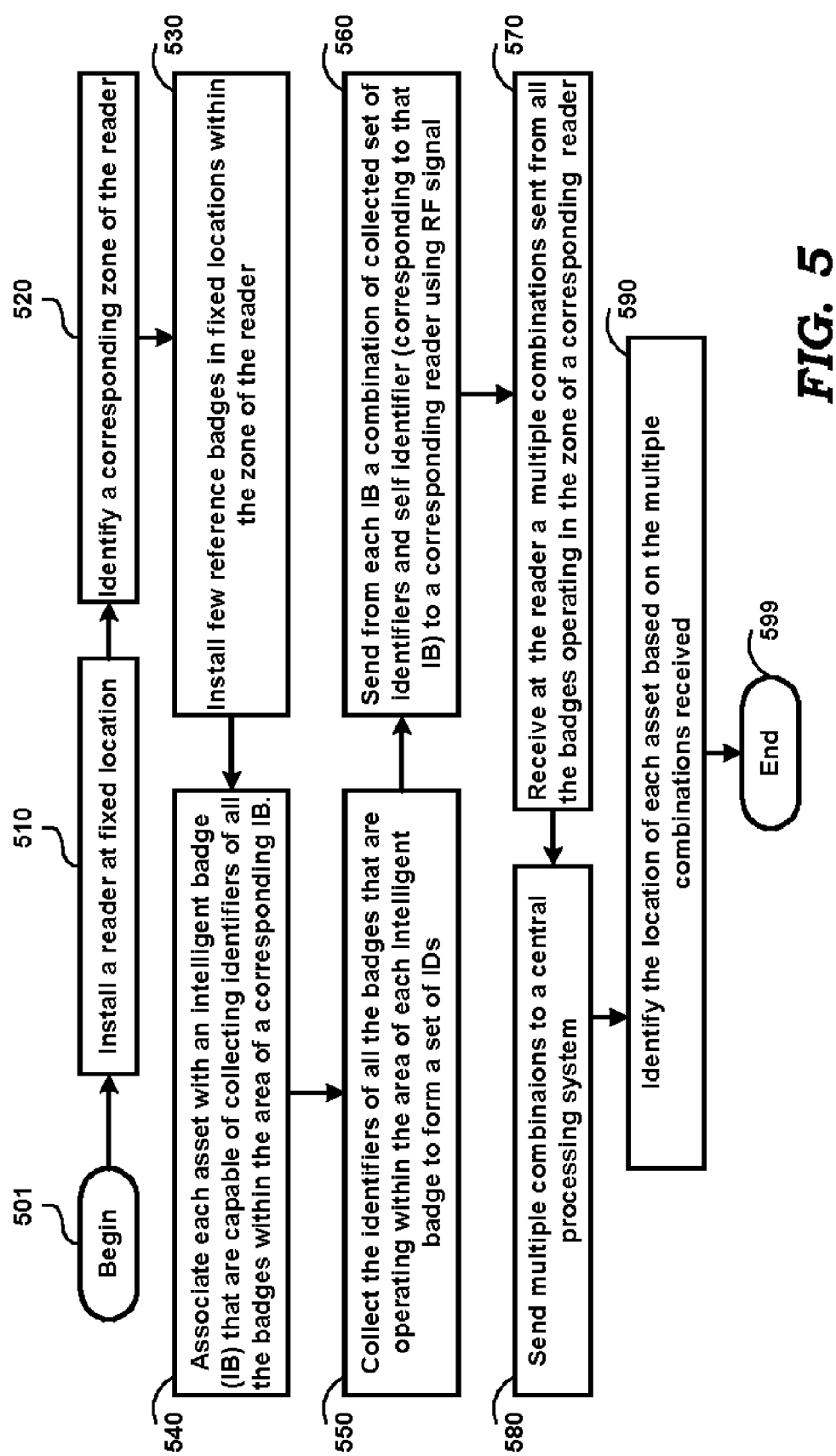
FIG. 5 is a flow-chart illustrating the details of an approach employing intelligent badges associated with each asset to identify the location of an asset according to one more aspect of the present invention.

7. Increasing the Resolution of Identifying the Specific Location of an Asset of Interest FIG. 5 is a flow-chart illustrating the manner in which resolution of identifying the specific location of an asset of interest can be improved according to an aspect of the present invention. For illustration, flow-chart is described with reference to environment of FIG. 4. However, the method may be implemented in other environments as well. The method begins in step 501 in which control immediately passes to step 510.

Steps 510, 520, and 530 are similar to steps 310, 320 and 330 and the description is not repeated for conciseness. However, the number of IBs desired may not be computed (as described in step 335 of FIG. 3) as each asset is associated with an IB. The remaining steps 540 through 599 are described below.

In step 540, each asset is associated with an intelligent badge (IB) that are capable of collecting identifiers of all the badges located within the area of a corresponding IB. For example, intelligent badges 470-A through 470-Z are attached to assets 140-A through 140-Z and each IB collects the identifiers of IBs and reference badges located within a corresponding zone.

In step 550, each intelligent badge collects the identifiers of all the IBs (sent using IR signal) and reference badges that are located within the area of a corresponding intelligent badge to form a set of collected identifiers. For example, IB 470-A (associated with asset 140-A) collects the identifiers of IB 470-B and reference badge 293, generates a set, and sends the set along with identifier of IB 470-A.

In step 560, each IB sends a combination of set of collected identifiers and self identifier of a corresponding IB to a corresponding reader. For example, IB 470-A sends combination of identifiers of IB 470-B, reference badge 293 and self identifier using RF signal.

In step 570, reader receives multiple combination, with each combination containing a set of collected identifiers and a self identifier sent from each of the IBs located in the corresponding readers zone. For example, reader 220 receives a combination from IB 470-A through 470-G.

In step 580, reader forwards multiple combinations to a central processing system. Multiple combinations may be forwarded to central processing systems using technologies such as LANs, wire-less networks, etc., in a known way.

In step 590, central processing system computes the location of each asset based on the multiple combinations received. The resolution of identifying a location of assets is improved as each IB sends a set containing the identifiers of badges in a corresponding badge zone. The method ends in step 599. The resolution of identifying the location of an asset may thus be improved.

It should be appreciated that the approaches described above may be implemented in the context of various environments. For example, the absolute (geographical) coordinates of the reader can be determined using GPS receivers (as is well known in the relevant arts), and the geographical coordinates of each asset may be determined relative to the reader position.

Thus, the location of an asset located within the zone of a mobile reader may be identified. The description is continued with respect to another aspect of the present invention in which a group of assets can be tracked as a single entity (asset). Such a tracking may minimize the processing requirements in processing system 210.

8. Tracking a Group of Assets as a Single Entity/Asset

Figure 6:
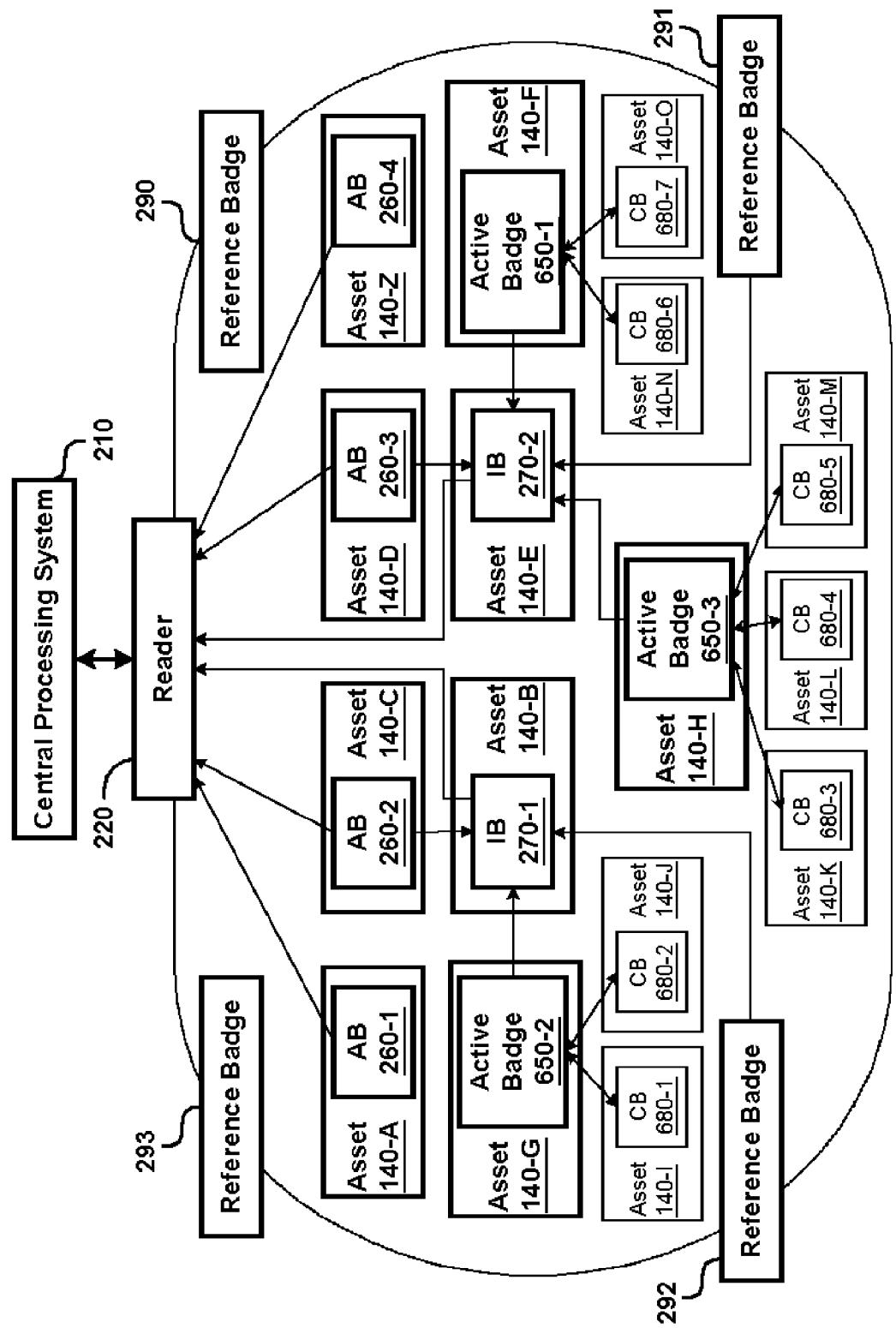
FIG. 6 is a block diagram of an example environment implemented according to yet another aspect of the present invention.

FIG. 6 is a block diagram illustrating an example environment illustrating the manner in which a group of assets may be tracked as a single entity. The block diagram is shown containing central processing system 210, reader 220, assets 140-A through 140-Z, asset badges 260-1 through 260-4, intelligent badges 270-1 and 270-2, reference badges 290 through 293, active badges 650-1, 650-2 and 650-3, and component badges (CB) 680-1 through 680-7. Only the differences in FIG. 6 as compared to that of FIG. 2 is described below for conciseness.

Active badges are designed to receive a set of component badge identifiers from corresponding component badges located within the zone of the active badge. Active badge may have the ability to send set of component badge identifiers along with the self identifier to a corresponding intelligent badge. A component badge may be designed to transmit the badge identifier using the energy of a signal received from the active badge. Using component badges generally enables reduction in cost, while tracking a large number of assets.

Each active badge 650-1, 650-2 and 650-3 (respectively attached to assets 140-F, 140-G and 140-H) receives the component badge identifiers of the component badges located within the area of a corresponding one of active badges 650-1 through 650-3. Active badges in turn transmit a set of component badge identifiers along with self identifier (i.e., active badge identifier), which are received by intelligent badges (conveniently shown as only one IB) within the transmission range of the active badge.

For example, active badge 650-1 transmits a set of component badge identifiers (of component badges 680-6 and 680-7) along with self identifier to IB 270-2. IB 270-2 transmits a set of badge identifiers (of active, asset, reference and other intelligent badges) to central processing unit 210 (via reader 220). It may be appreciated that, each active badge identifier is associated with a set of component badge identifiers located within the zone of a corresponding active badge.

Each of the component badges 680-1 through 680-7 (respectively attached to assets 140-I through 140-O) located within a corresponding zone (of active badge) sends an identifier to a corresponding active badge using the signal energy provided by the active badge. The identifier is received by the active badge.

For example, component badges 680-6 and 680-7 (which are within the zone of active badge 650-1) send corresponding identifiers to active badge 650-1 using the RF energy provided by 650-1. A set of component badges are thereby associated to an active badge. The approximate location of each of component badges may be determined by determining the location of a corresponding active badge.

Central processing unit 210 processes multiple sets received from several IB(s) to determine the location of each badge including active badges (650-1 through 650-3). It may be noted that the location of an active badge may be determined similar to manner in which position of an asset badge is determined (as described above). As each active badge is associated with a set of component badges, the approximate location of a component badge of interest may be determined by determining the location of an active badge.

Thus, an approximate location of an asset associated with a component badge may be identified/tracked once the specific location of an active badge is identified. The description is continued with reference to a method in central processing system.

9. Central Processing System

Figure 7:
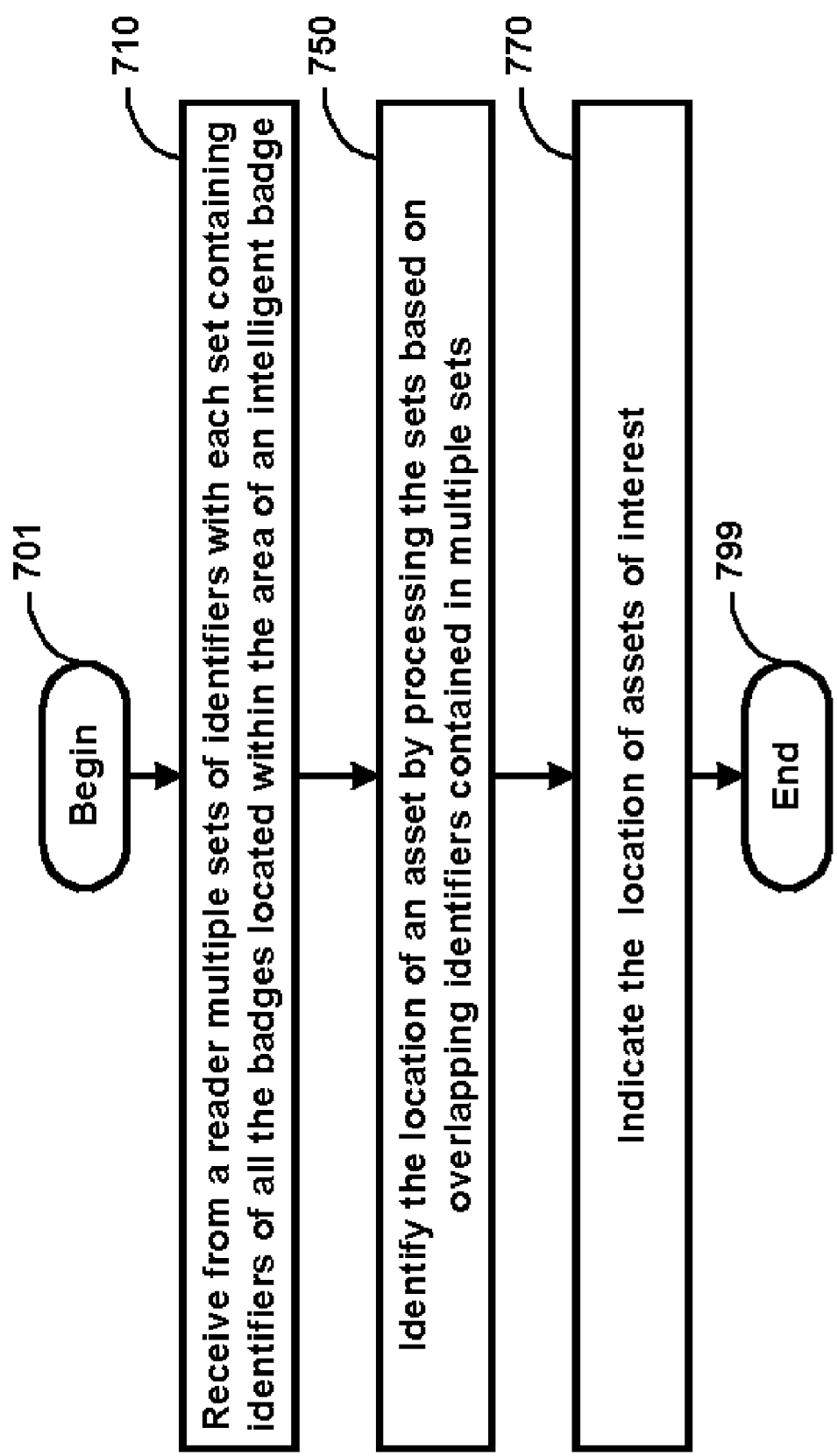
FIG. 7 is a flow-chart illustrating the manner in which a central processing system may support the determination of the location of each asset according to an aspect of the present invention.

FIG. 7 is a flow-chart illustrating the details of a method employed in a central processing system in one embodiment. For illustration, the flow-chart is described with reference to FIGS. 2 through 6, however, other embodiments employing similar methods are contemplated to be within the scope and spirit of several aspects of the present invention. The method begins in step 701 in which control immediately passes to step 710.

In step 710, central processing system receives from a reader multiple sets of identifiers with each set containing identifiers of all the badges located within the zone of an intelligent badge.

In step 750, central processing system computes the specific location of assets by processing the sets based on overlapping identifiers contained in multiple sets. In step 770, central processing system indicates the location of assets, for example, in response to user requests. The method ends in step 799.

Thus, a central processing system identifies the location of an asset. The description is continued with reference to an example implementation implemented substantially in the form of software.

10. Software Implementation

Figure 8:
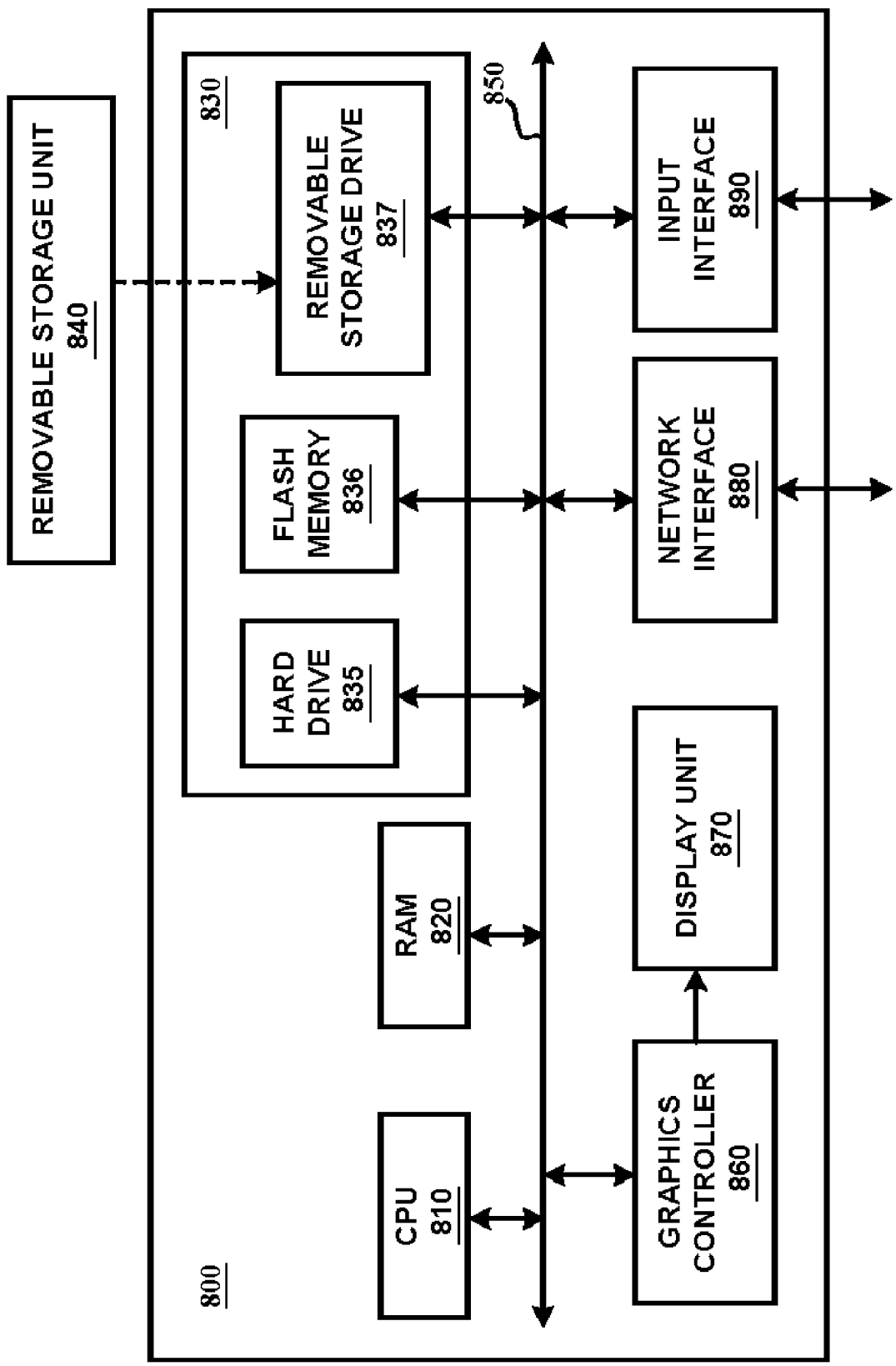
FIG. 8 is a block diagram illustrating the details of implementation of a processing system substantially in the form of software instructions in an embodiment of the present invention.

FIG. 8 is a block diagram illustrating the details of central processing system 210 implemented substantially in the form of software in an embodiment of the present invention. System 800 may contain one or more processors such as central processing unit (CPU) 810, random access memory (RAM) 820, secondary memory 830, graphics controller 860, display unit 870, network interface 880, and input interface 890. All the components except display unit 870 may communicate with each other over communication path 850, which may contain several buses as is well known in the relevant arts. The components of FIG. 8 are described below in further detail.

CPU 810 may execute instructions stored in RAM 820 to provide several features of the present invention. CPU 810 may contain multiple processing units, with each processing unit potentially being designed for a specific task. Alternatively, CPU 810 may contain only a single general purpose processing unit. RAM 820 may receive instructions from secondary memory 830 using communication path 850. The instructions may implement applications that identifies the specific location of an asset as described above.

Graphics controller 860 generates display signals (e.g., in RGB format) to display unit 870 based on data/instructions received from CPU 810. Display unit 870 contains a display screen to display the images defined by the display signals. Input interface 890 may correspond to a key_board and/or mouse. Graphics controller 860 and input interface 890 enable an user to provide search criteria (i.e., specify assets of interest) and view results.

Secondary memory 830 may contain hard drive 835, flash memory 836 and removable storage drive 837. Secondary memory 830 may store the data and software instructions (e.g., multiple combinations containing badge identifiers sent by a reader, instructions enabling system 800 to identify the specific location), which enable system 800 to provide several features in accordance with the present invention. Some or all of the data and instructions may be provided on removable storage unit 840, and the data and instructions may be read and provided by removable storage drive 837 to CPU 810. Floppy drive, magnetic tape drive, CD_ROM drive, DVD Drive, Flash memory, removable memory chip (PCMCIA Card, EPROM) are examples of such removable storage drive 837.

Removable storage unit 840 may be implemented using medium and storage format compatible with removable storage drive 837 such that removable storage drive 837 can read the data and instructions. Thus, removable storage unit 840 includes a computer readable storage medium having stored therein computer software and/or data.

In this document, the term "computer program product" is used to generally refer to removable storage unit 840 or hard disk installed in hard drive 835. These computer program products are means for providing software to system 800. CPU 810 may retrieve the software instructions, and execute the instructions to provide various features of the present invention as described above.

11. Conclusion

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

The invention claimed is:

1. A tracking system to track the location of a plurality of assets of interest, said tracking system comprising:
    a set of asset badges, wherein each of said set of asset badges is attached to a corresponding one of a first set of assets and transmits a corresponding badge identifier;
    a plurality of intelligent badges, wherein each of said plurality of intelligent badges is attached to a corresponding one of a second set of assets and transmits a corresponding badge identifier, wherein said first set of assets and said second set of assets are comprised in said plurality of assets;
    each of said plurality of intelligent badges receiving a corresponding one of a plurality of sets of badge identifiers, each of said plurality of intelligent badges sending said corresponding one of a plurality of sets of badge identifiers associated with a badge identifier of the intelligent badge, wherein the badge identifiers in each set are sent together associated with the badge identifier of the intelligent badge even if the badge identifiers in the set are it received at different time instances;
    a processing system receiving and processing said plurality of sets of badge identifiers and corresponding identifiers of said intelligent badges to determine a location of each of said plurality of assets of interest; and
    a reader receiving each of said plurality of sets of badge identifiers and said associated badge identifier from a corresponding one of said plurality of intelligent badges, said reader sending said plurality of sets of badge identifiers and said associated badge identifiers to said processing system, wherein said reader is associated with a reader zone,
    wherein each of said asset badges transmits a corresponding badge identifier using a first type of signals suited for a first distance range, and each of said plurality of intelligent badges sends said corresponding one of said plurality of sets of badge identifiers associated with said badge identifier of the intelligent badge using a second type of signals suited for a second distance range, wherein said second distance range is more than said first distance range,
    wherein said reader is located within a distance of said second distance range from each of said plurality of intelligent badges.

2. The tracking system of claim 1, wherein a first set of badge identifiers and a second set of badge identifiers contain at least one common badge identifier, wherein said processing system determines said physical location of a common badge by identifying said at least one common badge identifier, wherein said first set and said second set are received from different intelligent badges and comprised in said plurality of sets of badge identifiers.

3. The tracking system of claim 2, further comprising a reference badge positioned at a known location in an area where said plurality of assets are located, wherein said reference badge also transmits a reference badge identifier, wherein a first intelligent badge contained in said plurality of intelligent badges receives said reference badge identifier and sends said reference badge identifier to said processing system via said reader, wherein said processing system determines the physical location of a first intelligent physical zone of said first intelligent badge, and thus the location of each of said plurality of assets relative to said known location.

4. The tracking system of claim 3, wherein each of said set of asset badges sends the corresponding identifier in both a radio-frequency (RF) signal and an infrared (IR) signal, wherein the identifier encoded in said RF signal is received by said reader and the identifier encoded in said IR signal is received by one or more of said plurality of intelligent badges.

5. The tracking system of claim 2, further comprising:
    a set of component badges, wherein said set of component badges are attached to corresponding one of a fourth set of assets; and
    a set of active badges, wherein each of said set of active badges is attached to a corresponding one of a third set of assets, wherein said third set of assets and said fourth set of assets are contained in said plurality of assets,
    wherein a first active badge receives a set of component badge identifiers from said set of component badges, wherein said set of component badge identifiers and a first active badge identifier is sent by said first active badge to a first intelligent badge contained in said plurality of intelligent badges, wherein said first active badge identifier identifies said first active badge and said first active badge is contained in said set of active badges,
    wherein said processing system receives said first active badge identifier associated with said set of component badge identifiers from said first intelligent badge, said processing system determining the location of said first active badge by treating said first active badge identifier similar to each of said badge identifiers of said asset badges, wherein the approximate location of each of said fourth set of assets is same as the location of said first active badge, wherein said processing system determines the location of said set of component badges with reduced computational complexity.

6. The tracking system of claim 1, wherein each of said plurality of sets of badge identifiers comprises the identifier of one of said intelligent badge or said plurality of asset badges.

7. The tracking system of claim 1, wherein an intelligent badge is attached to each of said plurality of assets of interest such that said relative location is determined with more precision.

8. A method of tracking the location of a plurality of assets of interest, said method comprising:
attaching each of a set of asset badges to a corresponding one of a first set of assets, wherein each of said set of asset badges transmits a corresponding badge identifier;
attaching each of a plurality of intelligent badges to a corresponding one of a second set of assets, wherein each of said plurality of intelligent badges also transmits a corresponding badge identifier, wherein said first set of assets and said second set of assets are comprised in said plurality of assets;
receiving each of a plurality of sets of badge identifiers in a corresponding one of said plurality of intelligent badges;
transmitting from each intelligent badge a corresponding one of said plurality of sets of badge identifiers along with a badge identifier of the intelligent badge, wherein the badge identifiers in each set are sent together associated with the badge identifier of the intelligent badge even if the badge identifiers in the set are received at different time instances, wherein each of said asset badges transmits said corresponding badge identifier using a first type of signals suited for a first distance range, and each of said plurality of intelligent badges sending said corresponding one of said plurality of sets of badge identifiers along with a badge identifier of the intelligent badge using a second type of signals suited for a second distance range, wherein said second distance range is more than said first distance range;
receiving in a reader each of said plurality of sets of badge identifiers and said associated badge identifier from a corresponding one of said plurality of intelligent badges, wherein said reader sends said plurality of set of badge identifier to a processing system, wherein said reader is located within a distance of said second distance range from each of said plurality of intelligent badges, wherein said reader is associated with a reader zone; and
processing in said processing system said plurality of sets of badge identifiers and corresponding identifiers of said intelligent badges to determine a location of each of said plurality of assets of interest.

9. The method of claim 8, wherein a first set of badge identifiers and a second set of badge identifiers contain at least one common badge identifier, wherein said processing determines said physical location by identifying said at least one common badge identifier, wherein said first set and said second set are received from different intelligent badges and comprised in said plurality of sets of badge identifiers.

10. The method of claim 9, further comprising positioning a reference badge at a known location in an area where said plurality of assets are located, wherein said reference badge also transmits a reference badge identifier, wherein a first intelligent badge contained in said plurality of intelligent badges receives said reference badge identifier and sends said reference badge identifier, wherein said processing determines the physical location of each of said plurality of assets relative to said known location.

11. The method of claim 8, further comprising:
attaching each of a set of component badges to a corresponding one of a fourth set of assets; and
a set of active badges, wherein each of said set of active badges is attached to a corresponding one of a third set of assets, wherein said third set of assets and said fourth set of assets are contained in said plurality of assets,
wherein a first active badge receives a set of component badge identifiers from said set of component badges, wherein said set of component badge identifiers and a first active badge identifier is sent by said first active badge to a first intelligent badge contained in said plurality of intelligent badges, wherein said first active badge identifier identifies said first active badge and said first active badge is contained in said set of active badges,
wherein said processing system receives said first active badge identifier associated with said set of component badge identifiers from said first intelligent badge, said processing system determining the location of said first active badge by treating said first active badge identifier similar to each of said badge identifiers of said asset badges, wherein the approximate location of each of said fourth set of assets is same as the location of said first active badge, wherein said processing system determines the location of said set of component badges with reduced computational complexity.

12. The tracking system of claim 1, wherein each of said plurality of intelligent badges is associated with a corresponding intelligent physical zone, the set of badge identifiers received by an intelligent badge corresponding to asset badges located in the intelligent physical zone of the intelligent badge, wherein a physical location of each of said set of badges is determined as being in one or more of said intelligent physical zones by said processing of said processing system, said reader zone containing said intelligent physical zones.

13. The method of claim 8, wherein each of said plurality of intelligent badges is associated with a corresponding intelligent physical zone, the set of badge identifiers received by an intelligent badge corresponding to asset badges located in the intelligent physical zone of the intelligent badge, wherein a physical location of each of said set of badges is determined as being in one or more of said intelligent physical zones by said processing of said processing system, said reader zone containing said intelligent physical zones.

14. A method of tracking the location of a plurality of assets of interest, said method comprising:
attaching each of a set of asset badges to a corresponding one of a first set of assets, wherein each of said set of asset badges transmits a corresponding badge identifier;
attaching each of a plurality of intelligent badges to a corresponding one of a second set of assets, wherein each of said plurality of intelligent badges also transmits a corresponding badge identifier, wherein said first set of assets and said second set of assets are comprised in said plurality of assets;
receiving each of a plurality of sets of badge identifiers in a corresponding one of said plurality of intelligent badges;
transmitting from each intelligent badge a corresponding one of said plurality of sets of badge identifiers along with a badge identifier of the intelligent badge, wherein the badge identifiers in each set are sent together associated with the badge identifier of the intelligent badge even if the badge identifiers in the set are received at different time instances;

said transmitting being performed without requiring a request to transmit from any external systems;

wherein a reader receives each of said plurality of sets of badge identifiers and associated badge identifier from a corresponding one of said plurality of intelligent badges, said reader sending said plurality of set of badge identifiers and associated badge identifier to said processing system, wherein each of said asset badges transmits corresponding badge identifier using a first type of signals suited for a distance range, and each of said plurality of intelligent badges sending said corresponding one of said plurality of sets of badge identifiers associated with said badge identifier of the intelligent badge using a second type of signals suited for a second distance range, wherein said second distance range is more than said first distance range, and wherein said reader is located within a distance of said second distance range from each of said plurality of intelligent badges; and processing in a processing system said plurality of sets of badge identifiers and corresponding identifiers of said intelligent badges to determine a location of each of said plurality of assets of interest.

15. The method of claim 14, wherein each of said asset badges also transmits without requiring a request to transmit from any external systems.

16. The method of claim 14, wherein said external systems contain said reader.

* * * * *